United States Patent [19]

Vaughan

[11] Patent Number: 4,554,146
[45] Date of Patent: Nov. 19, 1985

[54] PROCESS FOR PREPARING A ZEOLITE OF THE L TYPE USING ORGANIC TEMPLATES

[75] Inventor: David E. Vaughan, Flemington, N.J.

[73] Assignee: Exxon Research and Engineering Co., Florham Park, N.J.

[21] Appl. No.: 550,895

[22] Filed: Nov. 10, 1983

[51] Int. Cl.$^4$ .............................................. C01B 33/28
[52] U.S. Cl. .................................... 423/329; 423/118; 423/326; 423/328
[58] Field of Search ...................... 423/118, 326–333; 502/60, 77

[56] References Cited

U.S. PATENT DOCUMENTS

| | | |
|---|---|---|
| 2,950,952 | 8/1960 | Breck et al. . |
| 3,216,789 | 11/1965 | Breck et al. . |
| 3,298,780 | 1/1967 | Fleck . |
| 3,306,922 | 2/1967 | Barrer et al. . |
| 3,308,069 | 3/1967 | Wadlinger et al. . |
| 3,692,470 | 9/1972 | Ciric . |
| 3,709,979 | 1/1973 | Chu ..................................... 423/328 |
| 3,832,449 | 8/1974 | Rosinski et al. . |
| 3,867,512 | 2/1975 | Young . |
| 3,947,482 | 3/1976 | Albers et al. . |
| 3,972,983 | 8/1976 | Ciric . |
| 4,175,114 | 11/1979 | Plank et al. ......................... 423/328 |
| 4,209,498 | 6/1980 | Whittam .............................. 423/328 |
| 4,241,036 | 12/1980 | Flanigen et al. . |
| 4,247,416 | 1/1981 | Doherty et al. ..................... 423/328 |
| 4,338,089 | 7/1982 | Schaper et al. . |

FOREIGN PATENT DOCUMENTS

| | | |
|---|---|---|
| 1117568 | 6/1968 | United Kingdom . |
| 1202511 | 8/1970 | United Kingdom . |
| 1345363 | 1/1974 | United Kingdom ................ 423/328 |
| 1413470 | 11/1975 | United Kingdom ................ 423/329 |

OTHER PUBLICATIONS

Aiello et al., "J. Chem. Soc.", 1970, pp. 1470–1475.
Breck, "Zeolite Molecular Sieves", 1974, 282, 747, pp. 313–320.
Aiello et al., "Hydrothermal Chemistry of Silicates, etc.", J. Chem. Soc., 11, 833, 1970, pp. 1470–1475.
Baerlocher et al., "The Structure of the Synthetic ZEolite (K,Ba)–G,L", Zeit. fur Krist., 136, pp. 245–254.
Barrer et al., "Probable Structure of Zeolite $\Omega$", Chem. Comm., (1969), pp. 659–660.
Barrer et al., "The Crystal Structure of Zeolite L", Zeit, fur Krist., (1969) 128, pp. 352–370.
Galli et al., "Mazzite, a New Mineral, the Natural Counterpart of the Synthetic Zeolite $\Omega$", Contr. Miner. and Petrol, 45, (1974) pp. 99–105.
Barrer et al., "Hydrocarbons in Zeolite L", Surf. Science, 12 (1968), pp. 341–353.
Barrer et al., "Chemistry of Soil Minerals, Part XIV, Action of Some Basic Solutions on Metakaolinite and Kaolinite", J.C.S. Dalton (1974) pp. 934–941.
Barrer et al., "Chemistry of Soil Minerals, Part XII, Transformation of Metakaolinite with Solutions Containing Barium Hydroxide", J.C.S. Dalton, (1972) pp. 1259–1265.
Barrer et al., "431, Hydrothermal Chemistry of Silicates, Part XIII, Synthetic Barium Aluminosilicates", pp. 2296–2305.
Galli, "Mazzite, a Zeolite", Cryst. Struct. Comm., 3, (1974), pp. 339–344.

*Primary Examiner*—Edward J. Meros
*Attorney, Agent, or Firm*—Janet Hasak; E. Thomas Wheelock

[57] ABSTRACT

A zeolite of the L type is prepared by crystallization from a reaction mixture aged at 70° to 260° C. containing water, a source of silica or germania, a source of alumina or gallia, a source of potassium (and optionally up to 40 mole percent of a source of sodium, based on total mole percent of potassium and sodium), and a salt of a tetraalkylammonium cation wherein at least two alkyl groups have more than one carbon atom. Most preferably the cation is tetraethylammonium cation.

15 Claims, No Drawings

PROCESS FOR PREPARING A ZEOLITE OF THE L TYPE USING ORGANIC TEMPLATES

BACKGROUND OF THE INVENTION

This invention relates to a novel process for synthesizing a zeolite of the L type using organic and inorganic cations.

A synthetic, crystalline, potassium-containing zeolite designated as zeolite L is known to exhibit good catalytic properties, particularly for hydrocarbon conversion, and advantageous sorbent properties as described, for example, by Barrer et al., *Surface Science*, 12, 341 (1968). The chemical composition of zeolite L is disclosed in U.S. Pat. No. 3,216,789 to be:

$$0.9\text{--}1.3(Na,K)_2O:Al_2O_3:5.2 \text{ to } 6.9 \text{ } SiO_2:xH_2O$$

where x is 0 to 9.

Zeolite L and zeolites having related structures belong to the "L" family of zeolites. This family is characterized by having a 12-ring hexagonal structure with pore dimensions of about 5.5 to 7.2 Å. In addition to Zeolite L, there are also barium zeolites Ba-G or Ba-G,L described by Barrer et al. in *J. Chem. Soc.*, 2296 (1964), *J. Chem. Soc.*, 1254 (1972) and *J. Chem. Soc.*, 934 (1974); Linde omega disclosed in U.S. Pat. No. 4,241,036; zeolite ZSM-4 disclosed in U.K. Pat. No. 1,117,568; and the mineral mazzite which occurs in nature (see Galli et al., *Contrib. Mineral and Petrologie*, 45, 99 (1974)). ZSM-10, described in U.S. Pat. No. 3,692,470, may also be classified in this "family" of zeolites, as may Zeolite UJ described in U.S. Pat. No. 3,298,780.

Structures have been proposed for Zeolite L (Barrer et al., *Zeit. Krist.*, 128, 352 (1969)), Linde omega (Barrer et al., *Chem. Comm.*, 659 (1969)) and mazzite (Galli, *Crystal Str. Comm.*, 339 (1974)). Galli et al., *Contrib. Min. and Petr.*, 45, 99 (1974) have compared the data for zeolite L, omega and mazzite. Meier et al., *Atlas of Zeolite Structures* (1978) propose that mazzite, ZSM-4 and omega are isostructural differing only in Si/Al ratios and cation contents. If all cation positions in L are filled by alkali monovalent cations L will have a minimum Si/Al ratio of 1.8 according to Baerlocher et al., *Zeit. Krist.*, 136, 253 (1972).

Typical preparations of zeolite L are disclosed in U.S. Pat. No. 3,216,789; Breck, *Zeolite Molecular Sieves*, New York: J. Wiley, 283 (1974) and U.K. Pat. No. 1,202,511 (wherein the product is a dry gel). Other workers have prepared zeolite L from gels, mixed base systems and metakaolin. See, e.g., Barrer et al., *J. Chem. Soc. Dalton*, 1258 (1972); Barrer et al., *J. Chem. Soc. Dalton*, 934 (1974); and U.S. Pat. No. 3,867,512 to Young.

U.S. Pat. No. 3,947,482 to Albers et al. describes synthesis of open framework zeolites such as zeolite L and offretite by reaction of a silica source, alumina source, sodium hydroxide and/or potassium hydroxide in the presence of a seeding (nucleation) slurry prepared using an organic template agent, which consists of quaternary compounds $R_4M^+A^-$ where M is a Group 5A element such as N or P and R is $C_1$ to $C_7$ and $A^-$ is an anion, and various complex organic ring compounds. The zeolite synthesis mixture itself contains no template.

Aiello et al., *J. Chem. Soc. Dalton*, 1470 (1970) discloses reacting oxide mixtures to synthesize zeolites including zeolite L in the presence of a tetramethylammonium cation.

U.S. Pat. Nos. 3,306,922; 3,308,069; 3,832,449; 3,972,983; 4,247,416 and 4,338,089 disclose synthesis of zeolites in the presence of tetraalkylammonium cations having alkyl groups of 2 to 4 carbon atoms. There is no disclosure of synthesizing zeolite L.

The established methods of synthesis generally yield either poorly crystalline products or submicrocrystalline particles which are difficult to recover from the mother liquor crystallization media, or use excess levels of reactants which create major water pollution problems.

SUMMARY OF THE INVENTION

According to this invention a crystalline, potassium-containing zeolite of the L type in structure having a $(Si,Ge)O_2:(Al,Ga)_2O_3$ ratio of from 3 to 7 and an X-ray powder diffraction pattern with major intensities which are essentially that given in Table I may be prepared by a process which comprises:

(a) preparing a reaction mixture comprising water, a source of silica or germania, a source of alumina or gallia, a tetraalkylammonium salt where two of the alkyl groups are $C_1$–$C_4$ and the other two alkyl groups are at least $C_2$, a source of potassium, and up to about 40% by mole fraction of a source of sodium based on total sources of potassium and sodium, said reaction mixture having a composition, in terms of mole ratios of oxides, within the following ranges:

$(M,R)_2O:(Al,Ga)_2O_3$: 1.4 to 4
$(Si,Ge)O_2:(Al,Ga)_2O_3$: 2.5 to 15
$H_2O:(Al,Ga)_2O_3$: 90 to 200
$R_2O:M_2O$: 0.05 to 0.5 where M is K or a mixture of K and Na, and R is a tetraalkylammonium cation having alkyl groups as described above; and (b) maintaining the reaction mixture at between about 70° and 260° C. for between about 1 and 10 days until crystals of said zeolite are formed.

The process herein enables the preparation of high quality zeolite of the L type free of impurity phases. The zeolite product thus obtained typically has improved sorption capacity over zeolite L prepared by other methods and rapidly imbibes large quantities of cyclohexane after removal of any trapped organic cations by calcination. The zeolite is highly crystalline and can be readily recovered from the mother liquor. The higher silica ranges of these preparation methods are particularly useful for preparing L type zeolite products of higher silica to alumina ratios.

It is noted that several different zeolites crystallize from the general $K_2O\text{-}SiO_2\text{-}Al_2O_3\text{-}H_2O\text{-}R_4N.X$ composition range considered herein, the primary zeolite being an intergrown material designated as zeolite T and disclosed in U.S. Pat. No. 2,950,952. This material is a mixture of the erionite and offretite zeolites, but higher levels of template often eliminate the erionite component. When the organic tetraalkylammonium cation herein includes more than two methyl groups, zeolite T predominates as the product. When, however, larger organic cations are employed in the synthesis, as found in the present process, pure zeolite L is crystallized. In addition to suppressing the formation of erionite and offretite, the present process also minimizes or eliminates formation of phillipsite, chabazite and KM impurities, allowing complete crystallization to occur in the absence of impurities.

DESCRIPTION OF THE PREFERRED EMBODIMENTS

In the process represented by this invention a reaction mixture is prepared comprising a source of potassium, preferably potassium hydroxide, or potassium from the source of silica such as potassium silicate, and optionally in conjunction with the source of potassium up to about 30 mole percent of a source of sodium, preferably sodium hydroxide. Preferably no more than 20 mole percent of sodium hydroxide based upon total combined moles of sources of sodium and potassium is present. More preferably, no sodium source is present because it promotes formation of zeolite P and other impurities. In addition, the reaction mixture contains a tetraalkylammonium salt where two of the alkyl groups therein are $C_1-C_4$ alkyl groups and the other two alkyl groups contain at least two carbon atoms and are preferably $C_2-C_4$ alkyl groups. These alkyl groups may contain substituents such as hydroxyl groups which do not interfere with the synthesis of the zeolite. These tetraalkylammonium cations may be added as, for example, hydroxides or acidic salts, preferably chlorides or bromides. If the cation is added as a salt such as a halide, it is not an effective base and should not be added to the total base composition. For example, if the tetraalkylammonium cation is added as a bromide, the solution composition will contain $Br^-$ that is conventionally neutralized by the Group I cation (in this case $K^+$):

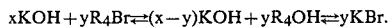

$xKOH + yR_4Br \rightleftharpoons (x-y)KOH + yR_4OH \rightleftharpoons yKBr.$

The total "effective base" used in these formulations is therefore $((x-y)KOH + yR_4OH)$. The excess KBr is assumed to be a neutral salt having no effect on the crystallization. Extensive investigations in several zeolite systems have shown this to be correct up to moderate excess salt concentrations. The reaction mixture will also contain water, a source of alumina or gallia, and a source of reactive silica or germania such as, e.g., silica gels, silicic acid, aqueous colloidal silica sols (as described, e.g., in U.S. Pat. No. 2,574,902), potassium or sodium silicates, etc. The aluminum or gallium may be provided in its oxide form dissolved in KOH and/or NaOH, or may be provided by another source of soluble Al or Ga compounds such as kaolin or halloysite, most preferably metakaolin, which has a theoretical oxide formula of $Al_2O_3:2SiO_2$. Metakaolin may be obtained, for example, by heating kaolin or halloysite clay, having an oxide formula of $Al_2O_3:2SiO_2 \cdot xH_2O$ (x equals 1 or 2, respectively), at over 600° C. for about two or more hours to remove the water(s) of hydration therefrom and to render the structure amorphous and reactive.

The amounts of ingredients in the reaction mixture will vary considerably depending, e.g., on the types of ingredients employed (e.g., the source of silica) and the particular composition ultimately desired. In general, however, the relative amounts of ingredients will be such that the reaction mixture will have a composition, in terms of mole ratios of oxides, within the following ranges:

| Oxide Constituents | Ranges of Mole Ratios |
| --- | --- |
| $(M,R)_2O:(Al,Ga)_2O_3$ | 1.4 to 4 |
| $(Si,Ge)_2O:(Al,Ga)_2O_3$ | 2.5 to 15 |
| $H_2O:(Al,Ga)_2O_3$ | 90 to 200 |
| $R_2O:M_2O$ | 0.05 to 0.5 | where M is potassium or a mixture of potassium and sodium (where the ratio of sodium to potassium does not exceed 0.4), and R is at least one tetraalkylammonium cation having alkyl groups as described above. If the cation is added as an acidic salt, the salt should be neutralized by an equivalent amount of base, and if the aluminum or gallium is added as an acidic salt, it must be neutralized by an equivalent amount of base. Particularly preferred slurry composition ranges are those that are closest to the stoichiometric yield of product from reactant. In preparing zeolite L itself, which has a $SiO_2/Al_2O_3$ ratio of 5.2 to 6.9, the preferred crystallization range is:

| Oxide Constituents | Ranges of Mole Ratios |
| --- | --- |
| $(M,R)_2O:Al_2O_3$ | 1.6 to 3 |
| $SiO_2:Al_2O_3$ | 4 to 11 |
| $H_2O:Al_2O_3$ | 100 to 160 |
| $R_2O:M_2O$ | 0.05 to 0.3 |

Preferably alumina and silica are employed rather than gallium oxide and germanium oxide, respectively. If gallium is employed, it is preferably employed in a ratio of aluminum to gallium between 1 and 40, and if germanium is employed, it is preferably employed in a ratio of silicon to germanium between 1 and 50. Examples of suitable tetraalkylammonium cations which may be employed, either alone or in mixtures, include tetraethylammonium cation, tetrapropylammonium cation, tetrabutylammonium cation, bis-(2-hydroxyethyl)-dimethylammonium cation, dimethyldiethylammonium cation, triethylpropylammonium cation, diethyldibutylammonium cation, and the like. Preferably, the cation is a tetraethylammonium, tetrapropylammonium, tetrabutylammonium, or bis-(2-hydroxyethyl)dimethylammonium cation, and most preferably tetraethylammonium cation.

The order of mixture of ingredients is not essential, but one method involves combining the silica source with the tetraalkylammonium salt along with an alumina source dissolved in potassium hydroxide. The reaction mixture is ordinarily prepared in a container made of metal or glass or the like which should be closed to prevent water loss, or equipped so as to maintain constant water levels.

After the reaction mixture is formed it is placed in a reactor where it is maintained at a temperature between about 70° and 280° C., preferably 90° and 170° C. for commercial purposes, to induce crystallization.

The reaction mixture after its formation is subjected immediately to the elevated reaction temperatures above prescribed, with slow stirring thereof, if necessary to ensure substantial homogeneity.

During heating of the substantially homogeneous reaction mixture, autogenous pressures are maintained which will depend on the temperature employed. For example, pressures of one atmosphere may be adequate for temperatures at the lower range, but at higher temperatures of, e.g., 200° C. or more, higher pressures may be achieved. The amount of time required for heating will depend mainly on the temperature employed and the type of slurry composition so that at 100° C. the heating may be carried out, e.g., for up to 5 to 7 days, whereas at about 160° C. the time period may be, e.g., 4 to 6 days. In general, the period of heating will be from 1 to 10 days until maximum amounts of crystals are formed of the desirable zeolite product, i.e., zeolite crystals having an X-ray diffraction pattern indicating its structure as of the L type. Thus, the pattern will have the major peak intensities indicated in Table I below.

TABLE I

Major Peaks in the X-ray Diffraction Pattern of Zeolite L
(after R. M. Barrer and H. Villager, Zeit. Krist., v/28, p. 352 (1969))

| $I/I_o$ | d(Å) |
|---|---|
| 100 | 15.80 |
| 14 | 7.89 |
| 15 | 7.49 |
| 25 | 5.98 |
| 32 | 4.57 |
| 30 | 3.91 |
| 20 | 3.66 |
| 23 | 3.48 |
| 14 | 3.26 |
| 34 | 3.17 |
| 22 | 3.07 |
| 15 | 3.02 |
| 23 | 2.91 |
| 19 | 2.65 |

Preferably, the zeolite obtained will have a composition, in terms of mole ratios of oxides, in the range:

1.0 to 1.1(M,R)$_2$O:Al$_2$O$_3$:5.2 to 7SiO$_2$ where M and R are defined above. Another preferred zeolite prepared by the process herein has a composition, in terms of mole ratios of oxides, in the range:

0.9 to 1.1(M,R)$_2$O:Al$_2$O$_3$:2.5 to 5.1SiO$_2$ where M and R are defined above.

The crystallization time may be shortened by seeding the slurry to be crystallized with minor amounts of a source of nuclei such as, e.g., zeolite L as described in U.S. Pat. No. 3,216,789 or a zeolite L type aluminosilicate. Preferably, before the reaction mixture is maintained at 70° to 280° C. a zeolite is added to the mixture in an amount of from 0.1 to 10% by weight based on silica and alumina, the zeolite having the composition, in terms of mole ratios of oxides, in the range:

0.9 to 1.1(Na,K)$_2$O:Al$_2$O$_3$:3.0 to 7.0SiO$_2$:O to 9H$_2$O

Nucleation may also be induced by aging the slurry or a portion of the slurry at about 10° to 100° C. for about 6 hours to 6 days prior to the crystallization at 70° to 280° C. Similarly, the seeding method described in co-pending U.S. Ser. No. 550,890 filed on Nov. 10, 1983 to D. E. W. Vaughan entitled "Process for Preparing Type L Zeolites by Nucleation Technique" may be employed.

When the zeolite crystals have been obtained in sufficient amount, they are recovered by filtration from the reaction mixture and are then washed, preferably with deionized or distilled water, to wash away excess mother liquor. The washing should continue, for best purity results, until the wash water, equilibrated with the product, has a pH of between about 9 and 12. After the washing step, the zeolite crystals may be dried or calcined. The preferred zeolite product herein is one which has been so washed at a pH between 7 and 9 so as to yield a product having a potassium to aluminum ratio of 1.0+0.03.

The zeolite prepared by the process of this invention, which is of the zeolite L type, may be used as a sorbent or as a catalyst, e.g., in a hydrocarbon conversion process such as in cracking or reforming operations, isomerization, aromatization, or alkylation, and in the hydrocracking of lube stocks and fuels. To be employed for these applications, the zeolite prepared by the above method may be at least partially dehydrated by drying at temperatures of up to about 500° C. or more until most or all of the water of hydration is removed.

It may also be desirable to exchange part or all of the potassium (and optionally sodium) cations in the zeolite structure with other cations, or to use the acid form of the zeolite containing hydrogen as the cation. Suitable exchangeable cations for this purpose include any cation of metals selected from any of Group I through VIII of the Periodic Table. Preferably, such cations include mono-, di-, and trivalent metal ions, particularly those of Groups I, II and III such as barium, sodium, potassium, calcium, cesium, lithium, magnesium, strontium, and zinc ions, and other cations such as rare earth, ammonium, and alkyl ammonium cations. This replacement may be accomplished by conventional ion-exchange techniques as discussed, for example, in U.S. Pat. No. 3,216,789.

Subsequent addition of metals may be accomplished by exchange or impregnation of salts or complexes, followed by appropriate reduction and calcining.

The process described herein represents an improved and efficient procedure for preparing the zeolites, since there is, in the preferred embodiment, little waste of the reactants employed, and the product is readily separated from the mother liquor because it is in highly crystalline form.

The examples which follow illustrate the invention. In all examples, parts and percentages are given by weight and temperatures in degrees Centigrade unless otherwise noted.

EXAMPLE 1

This example demonstrates that in the presence of small organic cations of the Linde T (offretite-erionite) zeolite readily crystallizes, whereas in the presence of larger cations, crystals of zeolite L type materials are formed. Except that different organic cations are employed in each synthesis, the slurry compositions and methods for preparing them are identical. Four slurries (Examples 1A-1D) were prepared as follows:

To a blender were sequentially added, with vigorous mixing, 200.3 g potassium silicate (12.5% K$_2$O and 26.3% SiO$_2$), a solution in 35 g of water of a given amount of a bromide salt with the tetraalkylammonium cation given in Table II, a potassium aluminate solution prepared by dissolving 15.2 g alumina in a hot solution of 19.2 g potassium hydroxide (85%) in 35 g water and cooling to room temperature, and 12.2 g of concentrated sulfuric acid diluted with 20 g water to neutralize excess base. The composition of the resulting slurries, expressed in terms of mole ratios of oxides, was:

(K,R)$_2$O:Al$_2$O$_3$: 2.9
SiO$_2$:Al$_2$O$_3$: 9
H$_2$O:Al$_2$O$_3$: 135

KBr/Al₂O₃: 0.6 where the ratio of R to K is about 0.25 and R is the tetraalkylammonium cation of the bromide salt employed.

The four resulting gels obtained were then reacted in a tetrafluoroethylene jar set in an oven at 100° C. for 5 days. The crystallized gels were then removed from the oven, filtered, washed and dried. The phase compositions of each zeolite obtained are given in Table II, as determined by X-ray crystallography. The zeolite L type zeolite had an X-ray diffraction pattern given in Table III. The chemical elemental analyses and compositions of the products of 1A to 1D are provided in Table IV.

TABLE II

| Example | Tetraalkylammonium Cation | Amount (g) | Structure |
|---|---|---|---|
| 1A (Control) | tetramethylammonium | 18 | Linde T (offretite-erionite) |
| 1B | tetraethylammonium | 24.6 | zeolite L type |
| 1C | tetrapropylammonium | 31.1 | zeolite L type |
| 1D | tetrabutylammonium | 37.7 | zeolite L type |

X-Ray diffraction analysis showed that these materials were of high crystallinity. Sample 1B was calcined at 550° C. for one hour, exchanged twice with a 10% solution of KCl in water at a pH of 8.5, and dried at 110° C. and then at 400° C. for one hour. Exposure to n-hexane at 1.7 torr and 23° C. resulted in a weight gain of 7.5% in five minutes. Chemical analysis showed that the Si:Al ratio of this exchanged sample was unchanged, but the K/Al ratio was now 0.99.

TABLE III

Specific X-ray diffraction pattern for Example 1B*
All peaks having I/I₀ > 2

| 2θ | d(Å) | I/I₀ |
|---|---|---|
| 5.512 | 16.02 | 100 |
| 11.755 | 7.522 | 14 |
| 14.696 | 6.022 | 16 |
| 15.000 | 5.901 | 9 |
| 19.275 | 4.601 | 45 |
| 20.099 | 4.414 | 7 |
| 22.652 | 3.922 | 56 |
| 23.400 | 3.788 | 4 |
| 24.211 | 3.673 | 19 |
| 24.261 | 3.665 | 10 |
| 25.555 | 3.483 | 29 |
| 27.183 | 3.278 | 20 |
| 27.499 | 3.341 | 4 |
| 27.952 | 3.189 | 50 |
| 29.046 | 3.072 | 36 |
| 29.526 | 3.023 | 6 |
| 30.682 | 2.911 | 33 |
| 33.795 | 2.650 | 43 |
| 35.868 | 2.501 | 9 |
| 36.251 | 2.476 | 5 |
| 39.154 | 2.299 | 6 |
| 39.488 | 2.280 | 6 |
| 41.025 | 2.198 | 21 |

*Sample was dried at 110° C. and equilibrated in ambient air.

Instrument: Siemens D500, Cu tube.
Scan = 4° to 45°; Angle increment = 0.02°
Count time = 1 sec. Lambda = 1.54051

TABLE IV

Analysis of the crystalline products of Example 1

| Sample | Zeolite | Chemical Analysis* | | | Stoichiometry | | |
|---|---|---|---|---|---|---|---|
| | | K | Al | Si | $K_2O$: | $Al_2O_3$: | $SiO_2$ |
| 1A | Linde T | 10.7 | 8.47 | 26.6 | — | 1 | 6.02 |
| 1B | L | 12.7 | 8.47 | 24.0 | 1.04 | 1 | 5.46 |
| 1C | L | 13.8 | 9.07 | 25.8 | 1.05 | 1 | 5.46 |
| 1D | L | 14.2 | 9.35 | 25.8 | 1.05 | 1 | 5.30 |

*Multielement simultaneous analysis using a plasma spectrometer.

EXAMPLE 2

A total of 30.3 g of tetraethylammonium bromide was dissolved in 105 g H₂O and added to 217.15 g potassium silicate as described in Example 1 in a blender to form a gel. Then 27.8 g of metakaolin (derived by heating hydride kaolin for 3 hours at 650° C.) was mixed into this gel and homogenized for five minutes. The gel had a composition, in terms of mole ratios of oxides, in the ranges:

$K_2O:Al_2O_3$: 1.8
$R_2O:Al_2O_3$: 0.6
$SiO_2:Al_2O_3$: 10
$H_2O:Al_2O_3$: 110
$KBr:Al_2O_3$: 1.2 wherein R is tetraethylammonium cation. Samples of the blended gel was then placed in 75 ml stainless steel test tube autoclaves and heated at 160° C. for 4.5 days. The autoclaves were then cooled and the samples were filtered, washed and dried. X-Ray diffraction analysis showed the product to be a pure zeolite L, and chemical analysis showed a composition with the ratio of $SiO_2$:$Al_2O_3$ equal to 6.80, demonstrating that this method is particularly useful for synthesizing higher $SiO_2/Al_2O_3$ ratio forms of zeolite L.

EXAMPLE 3

This example demonstrates the effect on the zeolite product of varying the amount of organic cation (template) from 0.2 to 1.6 moles per mole alumina.

A total of 15.2 g Al₂O₃.3H₂O was dissolved at 80° C. in a solution of 19.2 g KOH (85%) in 30 g water. The solution was cooled to room temperature and blended into 200.3 g potassium silicate in a blender to form a gel. To the gel was added 11.7 g of a 50% aqueous solution of bis-(2-hydroxyethyl)dimethylammonium hydroxide, followed by the slow addition of 14.2 g sulfuric acid diluted with 40 g water. The resulting slurry had a composition, in terms of mole ratios of oxides, in the range:

$K_2O:Al_2O_3$: 2.8
$R_2O:Al_2O_3$: 0.2
$SiO_2:Al_2O_3$: 9
$H_2O:Al_2O_3$: 135
$K_2SO_4:Al_2O_3$: 0.2 where R is a bis-(2-hydroxyethyl)dimethylammonium cation.

The slurry was reacted in a sealed tetrafluoroethylene bottle for 7 days at 100° C., filtered, washed and dried. The crystalline product had an X-ray diffraction pattern characteristic of pure zeolite L. Chemical analysis yielded a composition for the product of:

$1.03K_2O:Al_2O_3:5.50SiO_2$

The above procedure was followed exactly to prepare a second zeolite, except that 35.1 g of the bis-(2-hydroxyethyl)dimethylammonium hydroxide solution and 18.2 g of $H_2SO_4$ were employed, to yield a slurry with a composition, in terms of mole ratios of oxides, in the range:

$K_2O:Al_2O_3$: 2.4
$R_2O:Al_2O_3$: 0.6
$SiO_2:Al_2O_3$: 9
$H_2O:Al_2O_3$: 135
$K_2SO_4:Al_2O_3$: 0.6 where R is defined above. The product recovered after reaction had an X-ray diffraction pattern characteristic of pure zeolite L and a composition of:

$1.03K_2O:Al_2O_3:5.60SiO_2$.

The above procedure was followed exactly to prepare a third zeolite, except that 70.2 g of the bis-(2-hydroxyethyl)dimethylammonium hydroxide solution and 24.6 g of $H_2SO_4$ were employed, to yield a slurry with a composition, in terms of mole ratios of oxides, in the range:

$K_2O:Al_2O_3$: 1.8
$R_2O:Al_2O_3$: 1.2
$SiO_2:Al_2O_3$: 9
$H_2O:Al_2O_3$: 135
$K_2SO_4:Al_2O_3$: 1.2 where R is defined above. The product recovered after reaction had an X-ray diffraction pattern characteristic of pure zeolite L and a composition of:

$1.03K_2O:Al_2O_3:5.7SiO_2$.

EXAMPLE 4

A total of 15.03 g of $Al_2O_3.3H_2O$ was dissolved at 80° C. in a solution of 19 g KOH (85%) in 35 g water. This solution was cooled to room temperature and then added, in a blender, to a mixture of 198 g potassium silicate and 21.2 g tetraethylammonium bromide dissolved in 25 g water. The resulting slurry had a composition, in terms of mole ratios of oxides, in the range:

$K_2O:Al_2O_3$: 2.0
$R_2O:Al_2O_3$: 0.52
$SiO_2:Al_2O_3$: 9
$H_2O:Al_2O_3$: 135 where R is a tetraethylammonium cation.

After complete homogenization the slurry (in the form of a gel) was partly neutralized by adding 16 g sulfuric acid (96%) diluted in 25 g water. Water was then added to bring the total weight to 371 g. The gel was transferred to a tetrafluoroethylene jar and heated at 100° C. for 5 days. The product obtained, after being filtered, washed and dried, was found by X-ray diffraction analysis to be pure zeolite L, with a chemical composition of:

$1.08K_2O:Al_2O_3:5.8SiO_2$

EXAMPLE 5

A gallo-alumino-silicate L type zeolite was made using a composition:

$6K_2O:Al_2O_3:Ga_2O_3:16SiO_2:270H_2O:1.2(TEA)_2Br_2$.

A total of 5.73 g $Ga_2O_3$ and 4.37 g $Al_2O_3.3H_2O$ were dissolved in a caustic solution of 12 g KOH in 20 g $H_2O$ at reflux. After cooling this solution was blended with 125.7 g potassium silicate (K-Sil #6, P.Q. Corp.) followed by 15.4 g tetraethylammonium bromide dissolved in 25 g $H_2O$. Finally, 7.7 g $H_2SO_4$ (96%) diluted in 23 g $H_2O$ were added to the mixture. The sample was divided between two 125 ml Teflon bottles and hot aged at 100° C. After 3 days a sample was 90% crystalline L type zeolite, and after 4 days the sample was fully crystallized with no impurities. Chemical analysis was: 4.45% Al, 10.4% Ga, 23.1% Si and 12.9% K, corresponding to a product stoichiometry of:

$1.02K_2O:0.53Al_2O_3:0.47Ga_2O_3:5.24SiO_2$

EXAMPLE 6

A metakaolin slurry having a composition of:

$2.4K_2O:Al_2O_3:10SiO_2:1.2TEA\ Br:110H_2O$ was made by converting 27.8 g of UF Kaolin (Georgia Kaolin Co.) to metakaolin, 217.2 g K Sil #6 (P.Q. Corp.), 105 g $H_2O$, and 30.3 g tetraethylammonium bromide at 160° C. for five days at autogenous pressure (about 5 atm. pressure). The product comprised columnar crystals of 0.1 micron by 0.5 micron, an X-ray diffraction pattern characteristic of excellent (pure) zeolite L, and analyzed as 7.85% Al, 12.3% K and 27.8% Si, to give a zeolite L stoichiometry of:

$1.08K_2O:Al_2O_36.8SiO_2$

The $K_2O/Al_2O_3$ ratio was reduced to unity by washing the sample in a 5% solution of KCl, and the pH was adjusted to 8.0 using a few drops of concentrated HCl.

EXAMPLE 7

A metakaolin slurry composition of:

$1.95K_2O:Al_2O_3:8.5SiO_2:1.0TEA\ Br:110H_2O$ was synthesized by reacting:
29.15 g UF metakaolin (Georgia Kaolin Co.)
184.4 g K Sil #6 potassium silicate (P.Q. Corp.)
136.4 g $H_2O$
25.8 g tetraethylammonium bromide (TEA Br)

After hot aging in an autoclave for five days at 160° C. and autogenous pressure, the product was filtered, washed and analyzed. It comprised pure zeolite L by X-ray diffraction analysis, and had a chemical composition of 8.17% Al, 13.2% K and 27.4% Si, representing a zeolite L stoichiometry of:

$1.1K_2O:Al_2O_3:3.44SiO_2$

The ratio of $K_2O/Al_2O_3$ was reduced to unity by further washing the sample in a dilute solution of KCl equilibrated to a pH of 8.

In summary, the present invention is seen to provide a process for preparing zeolite L type materials by replacing part of the base metal cation with a relatively large tetraalkylammonium cation.

What is claimed is:

1. A process for synthesizing a crystalline, potassium-containing zeolite having a $(Si,Ge)O_2$ to $(Al,Ga)_2O_3$ ratio of from 3 to 7 and an X-ray powder diffraction pattern which is essentially that given in Table I which comprises:
  (a) preparing a reaction mixture comprising water, potassium silicate, optionally a source of germania, a source of alumina or gallia, a tetraalkylammonium salt wherein the cation is a tetraethylammonium, tetrapropylammonium, tetrabutylammonium, or bis-(2-hydroxyethyl)dimethylammonium cation, a source of potassium, and up to about 40% by mole fraction of a source of sodium based on total sources of potassium and sodium, said reaction mixtures having a composition, in terms of mole ratios of oxides, within the following ranges:

$(M,R)_2O:(Al,Ga)_2O_3$: 1.4 to 4
  $(Si,Ge)O_2:(Al,Ga)_2O_3$: 2.5 to 15
  $H_2O:(Al,Ga)_2O_3$: 90 to 200
  $R_2O:M_2O$: 0.05 to 0.5 where M is K or a mixture of K and Na, and R is the tetraalkylammonium cation; and
  (b) maintaining the reaction mixture, while it is substantially homogeneous, at between about 70° and 260° C. for between about 1 and 10 days until substantially pure crystals of said zeolite are formed.

2. The process of claim 1 wherein a source of sodium is not present in the reaction mixture.

3. The process of claim 1 wherein after step (a) but before step (b) the reaction mixture is blended sufficiently to form a substantially homogeneous mixture.

4. The process of claim 1 wherein the zeolite crystals are recovered.

5. The process of claim 1 wherein the source of alumina is kaolin or halloysite.

6. The process of claim 1 wherein the source of alumina is metakaolin.

7. The process of claim 1 wherein the reaction mixture is maintained at between 100° and 170° C.

8. The process of claim 1 wherein the zeolite contains no gallium and germanium.

9. The process of claim 1 wherein the zeolite has a composition, in terms of mole ratios of oxides, in the range:

1.0 to $1.1(M,R)_2O:Al_2O_3:5.2$ to $7SiO_2$ where M and R are defined in claim 1.

10. The process of claim 1 wherein the zeolite has a composition, in terms of mole ratios of oxides, in the range:

0.9 to $1.1(M,R)_2O:Al_2O_3:2.5$ to $5.1SiO_2$ where M and R are defined in claim 1.

11. The process of claim 1 wherein prior to step (b) microcrystals of a zeolite having a composition, in terms of mole ratios of oxides, in the range:

0.9 to $1.3(Na,K)_2O:Al_2O_3:5.2$ to $6.9SiO_2:xH_2O$ where x is 0 to 9 are added to the blended reaction mixture in an amount of from 0.1 to 10% by weight based on silica and alumina.

12. The process of claim 1 wherein prior to step (b) the blended reaction mixture is maintained at about 10° to 50° C. for from about 6 hours to 6 days.

13. The process of claim 1 wherein if the sources of alumina and tetraalkylammonium cation are acid salts, a base is added during step (a) in an effective amount to neutralize the sources of alumina and tetraalkylammonium cation.

14. A process for synthesizing a crystalline, potassium-containing zeolite having a composition, in terms of mole ratios of oxides, in the range:

1.0 to $1.1(K,R)_2O:Al_2O_3:5.2$ to $7SiO_2$ where R is a tetraethylammonium cation and having an X-ray powder diffraction pattern essentially that given in Table I, which process comprises:
  (a) preparing a reaction mixture comprising water, potassium silicate, metakaolin, and tetraethylammonium bromide, said reaction mixture having a composition, in terms of mole ratios of oxides, within the following ranges:

$(K,R)_2O:Al_2O_3$: 1.6 to 3.0
  $SiO_2:Al_2O_3$: 4 to 11
  $H_2O:Al_2O_3$: 100 to 160
  $R_2O:K_2O$: 0.05 to 0.3 where R is a tetraethylammonium cation;
  (b) blending the reaction mixture sufficiently to form a substantially homogeneous mixture; and
  (c) maintaining the blended reaction mixture at between 100° and 170° C. for between 4 and 6 days until crystals of said zeolite are formed.

15. The process of claim 1 additionally comprising the step of washing the substantially pure crystals of said zeolite produced in step (b) at a pH of between 7 and 9 so as to yield a product having a potassium to alumina ratio of $1.0\pm0.03$.

* * * * *